(12) United States Patent
Gostoli

(10) Patent No.: US 11,753,061 B2
(45) Date of Patent: Sep. 12, 2023

(54) NON-MOTORIZED TRANSPORT DEVICE WITH SKIS FOR TRANSPORTING A PERSON IN STANDING POSITION

(71) Applicant: SNOWSKUT, Dardilly (FR)

(72) Inventor: Marc Gostoli, Saint Martin d'Ardeche (FR)

(73) Assignee: SNOWSKUT, Dardilly (FR)

( * ) Notice: Subject to any disclaimer, the term of this patent is extended or adjusted under 35 U.S.C. 154(b) by 0 days.

(21) Appl. No.: 17/675,914

(22) Filed: Feb. 18, 2022

(65) Prior Publication Data

US 2022/0371645 A1    Nov. 24, 2022

(30) Foreign Application Priority Data

Dec. 22, 2020  (FR) ........................................ 2013982

(51) Int. Cl.
    *B62B 13/12*        (2006.01)
(52) U.S. Cl.
    CPC .................................... *B62B 13/12* (2013.01)
(58) Field of Classification Search
    CPC ....... B62B 13/12; B62B 17/065; A63C 5/025; A63C 2201/10; A63C 5/06; A63C 5/16; A63C 5/031; A63C 5/02; A63C 17/013
    See application file for complete search history.

(56) References Cited

U.S. PATENT DOCUMENTS

| 4,219,207 | A   | * | 8/1980  | Muir    | B62B 13/12  |
|           |     |   |         |         | 280/22.1    |
| 5,344,167 | A   | * | 9/1994  | Strouth | B62B 13/12  |
|           |     |   |         |         | 280/22.1    |
| 7,484,738 | B2  | * | 2/2009  | Belt    | A63C 5/031  |
|           |     |   |         |         | 280/14.26   |
| 9,174,663 | B2  | * | 11/2015 | Reinig  | B62B 13/12  |
| 9,717,977 | B2  | * | 8/2017  | De Loore| A63C 5/031  |

(Continued)

FOREIGN PATENT DOCUMENTS

| DE | 3628111 A1 *       | 3/1988  |           |
| DE | 102007034228 B3 *  | 1/2009  | A63C 5/065|

(Continued)

*Primary Examiner* — James A Shriver, II
*Assistant Examiner* — Michael T. Walsh
(74) *Attorney, Agent, or Firm* — CANTOR COLBURN LLP

(57) ABSTRACT

A non-motorized transport device including first and second skis; first front and rear fastening feet fastened on the first ski and second front and rear fastening feet fastened on the second ski; a longitudinal beam; an edging handle fastened to the longitudinal beam; and a connecting system connecting the longitudinal beam to the first and second front and rear fastening feet, the connecting system including first and second front connecting rods each including a middle portion pivotally mounted on the longitudinal beam about a respective front articulation axis and first and second end portions which are respectively connected to the first and second front fastening feet by respective front ball joint connections, and a rear connecting rod including a middle portion pivotally mounted on the longitudinal beam about a rear articulation axis and first and second end portions respectively connected to the first and second rear fastening feet by respective rear ball joint connections.

20 Claims, 5 Drawing Sheets

(56) References Cited

U.S. PATENT DOCUMENTS

| | | | | |
|---|---|---|---|---|
| 9,731,187 B2* | 8/2017 | Hurth | ............... | A63C 5/16 |
| 2003/0155726 A1* | 8/2003 | Braun | ............... | A63C 5/03 |
| | | | | 280/607 |
| 2008/0246255 A1* | 10/2008 | Hallsten | ............... | A63C 5/031 |
| | | | | 280/606 |
| 2009/0079149 A1* | 3/2009 | Taylor | ............... | B62B 13/06 |
| | | | | 280/22.1 |
| 2015/0353117 A1* | 12/2015 | Peng | ............... | B62B 13/10 |
| | | | | 280/14.21 |
| 2019/0076725 A1* | 3/2019 | Wheeler | ............... | A63C 5/16 |
| 2021/0370157 A1* | 12/2021 | Ballu | ............... | A63C 5/033 |

FOREIGN PATENT DOCUMENTS

| | | | | |
|---|---|---|---|---|
| EP | 5485 A * | 11/1979 | ............... | A63C 5/16 |
| FR | 2630339 A1 | 10/1989 | | |
| FR | 2710275 A1 * | 3/1995 | ............... | A63C 5/00 |
| FR | 2710275 A1 | 3/1995 | | |
| FR | 2770142 A1 * | 4/1999 | ............... | A63C 5/16 |
| FR | 3084047 A1 * | 1/2020 | ............... | B62B 13/10 |
| KR | 20040063645 A * | 7/2004 | | |
| WO | WO-0166203 A1 * | 9/2001 | ............... | A63C 5/02 |

\* cited by examiner

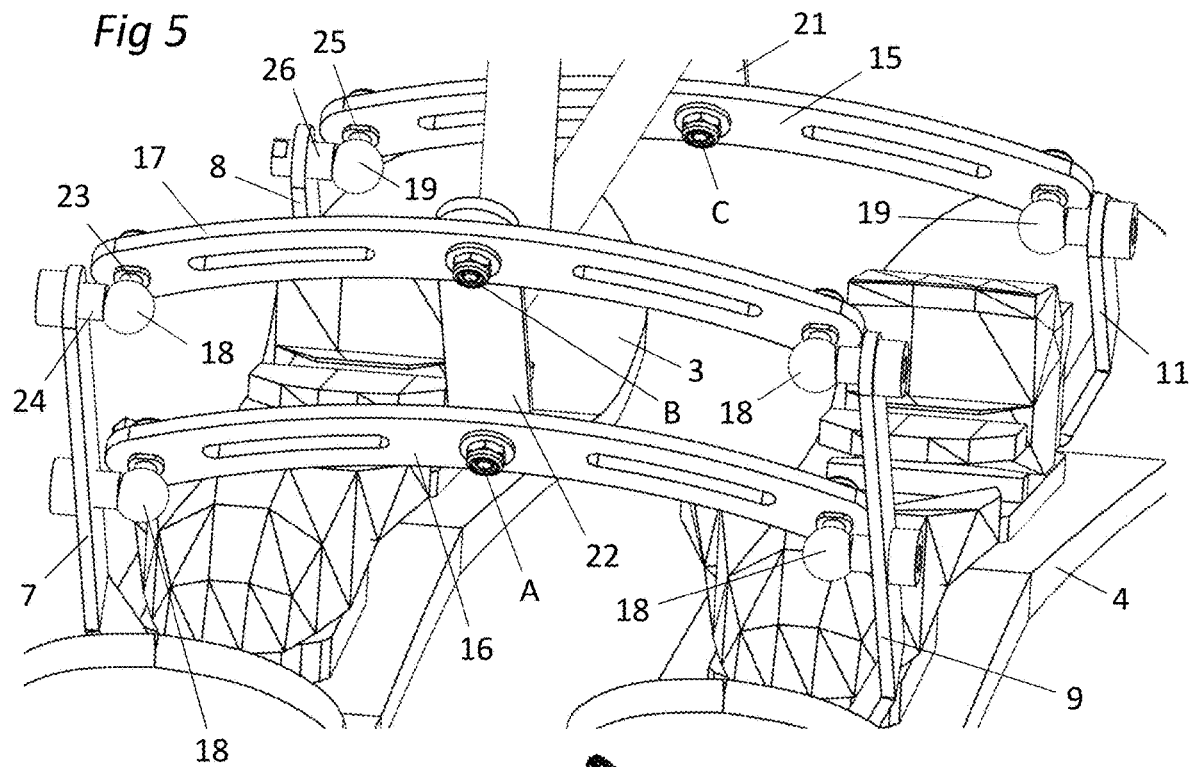

NON-MOTORIZED TRANSPORT DEVICE WITH SKIS FOR TRANSPORTING A PERSON IN STANDING POSITION

CROSS REFERENCE TO RELATED APPLICATIONS

This application claims priority under 35 U.S.C. § 119 to the following French Patent Application No. 20/13982, filed on Dec. 22, 2020, the entire contents of which are incorporated herein by reference thereto.

TECHNICAL FIELD

The present invention concerns a non-motorized transport device intended to transport a person, and in particular a person with reduced mobility or disabled, in standing position on a snowy slope.

BACKGROUND

It is known to transport a person with reduced mobility or disabled on a snowy slope in sitting position using a non-motorized transport device comprising in particular:
- a first ski and a second ski which are substantially parallel and which are intended to bear on the ground, the first and second skis respectively including a first fixing device and a second fixing device,
- a seat arranged to accommodate the person to be transported, and
- a connecting system configured to connect the seat to the first and second skis, the connecting system comprising a longitudinal beam on which the seat is mounted, two substantially parallel connecting rods extending transversely to the longitudinal beam, and first and second fixing soles respectively fastened on the first and second fixing devices.

Each connecting rod has a central portion pivotally mounted on the longitudinal beam about a respective central articulation axis and first and second end portions pivotally mounted respectively on the first and second fixing soles about respective lateral articulation axes.

When encountering a turn during a descent on a snowy slope, such a configuration of the connecting system causes a pivoting of the connecting rods relative to the longitudinal beam about the central articulation axes and a pivoting of the first and second fixing soles relative to the connecting rods about the lateral articulation axes. This results in a vertical differential displacement between the first and second skis, which corresponds to edging in a crossing course and ensures stability of such a transport device.

However, piloting of the aforementioned transport device is awkward when the latter is used to perform steep slope descents requiring long crossings and taking turns with small radii of curvature.

In addition, the aforementioned transport device is dedicated only for transporting a person in sitting position.

BRIEF SUMMARY

The present invention aims at overcoming these drawbacks.

Hence, the technical problem at the origin of the invention consists in providing a non-motorized transport device configured to transport a person in standing position on a snowy slope, which has a simple and economic structure, while having an improved handling and while conferring an improved slip feeling on the transported person.

To this end, the present invention concerns a non-motorized transport device for transporting a person, and for example a person with reduced mobility or disabled or a child, in standing position on a snowy slope, comprising:
- a first ski and a second ski which extend substantially parallel to each other and which are intended to bear on the ground, the first and second skis respectively including a first ski boot fixing device and a second ski boot fixing device, a first front fastening foot and a first rear fastening foot fastened on the first ski respectively at the front and at the rear of the first ski boot fixing device, and a second front fastening foot and a second rear fastening foot fastened on the second ski respectively at the front and at the rear of the second ski boot fixing device,
- a longitudinal beam,
- an edging handle, also named edge setting handle, which is fastened to a front portion of the longitudinal beam and which is configured to be handled by the transported person and/or an accompanier of the transported person, and
- a connecting system configured to connect the longitudinal beam to the first and second front fastening feet and to the first and second rear fastening feet, the connecting system including at least:
  - a first front connecting rod and a second front connecting rod extending transversely to the longitudinal beam, the first and second front fastening feet and the first and second front connecting rods forming a parallelogram linkage, each of the first and second front connecting rods including a middle portion pivotally mounted on the longitudinal beam about a respective front articulation axis and first and second end portions which are respectively connected to the first and second front fastening feet by respective front ball-joint connections, and
  - a rear connecting rod extending transversely to the longitudinal beam, the rear connecting rod including a middle portion pivotally mounted on a longitudinal beam about a rear articulation axis and first and second end portions respectively connected to the first and second rear fastening feet by respective rear ball-joint connections,
- each of the front and rear articulation axes being configured to extend obliquely forwards and downwards when soles of the first and second skis rest on a horizontal support.

When encountering a turn during a descent on a snowy slope, such a configuration of the non-motorized transport device according to the present invention, and in particular of the connecting system, causes not only a vertical differential displacement between the first and second skis, but also a longitudinal differential displacement between the first and second skis. Thus, when crossing a slope, the upstream ski is displaced forwards relative to the downstream ski.

These arrangements allow facilitating turning for the transported person, and therefore ensuring great handling and safety to the transport device according to the invention irrespective of the significance of the slope of the descent taken with the transport device, and regardless of the radii of curvature of the performed turns.

In addition, the interposition of ball-joint connections between the first and second front fastening feet and the first and second front connecting rods and between the first and second rear fastening feet and the rear connecting rod enables each of the first and second skis to be able to tilt forwards and rearwards independently (that is to say independently of the other one amongst the first and second skis) and to be able to be bent longitudinally. Thus, these arrangements enable the first and second skis to be able to adapt to the deformations of the terrain encountered by the transport device, which considerably limits wearing of the lining system and the risks of break-up of the latter and/or of the first and second skis.

Thus, the presence of the different ball-joint connections increases even more safety of use of the transport device according to the present invention.

The non-motorized transport device may further have one or more of the following features, considered alone or in combination.

According to an embodiment of the invention, the soles of the first and second skis are configured to extend substantially parallel to each other regardless of the angle of inclination of the edging handle.

According to an embodiment of the invention, the non-motorized transport device is configured to enable a person, in particular a child or a person with reduced mobility or disabled, to practice skiing while standing.

According to an embodiment of the invention, the longitudinal beam extends substantially parallel to the first and second skis.

According to an embodiment of the invention, when the soles of the first and second skis rest on a horizontal support, the front and rear articulation axes are inclined with respect to the horizontal of an angle comprised between 20 and 60°, and for example between 40 and 50°.

According to an embodiment of the invention, each of the first and second front and rear fastening feet is configured to extend obliquely forwards and upwards when the soles of the first and second skis rest on a horizontal support.

According to an embodiment of the invention, the first and second front connecting rods are configured to pivot in a first pivot plane and the rear connecting rod is configured to pivot in a second pivot plane which is substantially parallel to the first pivot plane.

According to an embodiment of the invention, the edging handle is equipped with a main handlebar intended to be grasped by the transported person and/or an accompanier of the transported person.

According to an embodiment of the invention, the edging handle is configured to extend substantially vertically when the soles of the first and second skis rest on a horizontal support.

According to an embodiment of the invention, the main handlebar has a width larger than the maximum distance separating outer longitudinal edges of the first and second skis.

According to an embodiment of the invention, each of the first and second front connecting rods and the rear connecting rod is bent in a circle arc.

According to an embodiment of the invention, the non-motorized transport device further includes an additional handlebar which is removably fastened to a rear portion of the longitudinal beam.

According to an embodiment of the invention, the rear connecting rod and the first and second front connecting rods have identical widths. Advantageously, the rear connecting rod and the first and second front connecting rods are identical.

According to an embodiment of the invention, the first and second skis are configured to extend, preferably symmetrically, on either side of the longitudinal beam when the soles of the first and second skis rest on a horizontal support.

According to an embodiment of the invention, the longitudinal beam extends in a longitudinal midplane of the non-motorized transport device when the soles of the first and second skis rest on a horizontal support.

According to an embodiment of the invention, the longitudinal beam includes a main beam portion which extends according to a direction of extension which is substantially parallel to the first and second skis. Advantageously, the direction of extension is substantially horizontal when the soles of the first and second skis rest on a horizontal support.

According to an embodiment of the invention, the main beam portion is rectilinear.

According to an embodiment of the invention, the main beam portion has a circular cross-section. Nevertheless, the main beam portion may have a cross-section with any other shape, and for example rectangular, oblong, square or still oval.

According to an embodiment of the invention, the longitudinal beam further includes a rear fastening member, such as a rear fastening tab, on which the middle portion of the rear connecting rod is pivotally mounted, and a front fastening member, such as a front fastening tab, on which the middle portions of the first and second front connecting rods are pivotally mounted. Advantageously, the rear fastening member is fastened to a rear end portion of the main beam portion, and the front fastening member is fastened to a front end portion of the main beam portion.

According to an embodiment of the invention, each of the first and rear fastening members is configured to extend obliquely with respect to the horizontal when the soles of the first and second skis rest on a horizontal support.

According to an embodiment of the invention, the front and rear fastening members are configured to extend in the longitudinal midplane of the non-motorized transport device when the soles of the first and second skis rest on a horizontal support.

According to an embodiment of the invention, the first front connecting rod and the rear connecting rod are configured to be located under the main beam portion when the soles of the first and second skis rest on a horizontal support.

According to an embodiment of the invention, the second front connecting rod is configured to be located above the main beam portion when the soles of the first and second skis rest on a horizontal support.

According to an embodiment of the invention, each of the front and rear ball-joint connections includes a first connecting member comprising a first mounting portion fastened to a respective connecting rod amongst the first and second front connecting rods and the rear connecting rod, and a second connecting member comprising a second mounting portion fastened to a respective fastening foot amongst the first and second front and rear fastening feet.

According to an embodiment of the invention, the first and second mounting portions of each of the front and rear ball-joint connections are directed substantially at 90° with respect to each other when the soles of the first and second skis rest on a horizontal support.

According to an embodiment of the invention, the first connecting member of each of the front and rear ball-joint connections includes a spherical head and the second connecting member of each of the front and rear ball-joint connections includes a spherical cavity within which the respective spherical head is fitted.

According to an embodiment of the invention, the second connecting member of each of the front and rear ball-joint connections includes an outer ring secured to the second respective mounting portion and an inner ring which is mounted articulated in the respective outer ring and which delimits a passage within which the respective first connecting member is received.

According to an embodiment of the invention, the widths of the first and second front connecting rods and of the rear connecting rod may vary according to the size of the transported person. For example, three different sizes of front connecting rods and rear connecting rod may be defined

BRIEF DESCRIPTION OF THE FIGURES

The present invention will be better understood from the following description with reference to the appended figures, wherein identical reference numerals correspond to structurally and/or functionally identical or similar elements.

FIG. 5 is a partial perspective view of the non-motorized transport device of FIG. 1.

FIG. 6 is a perspective view of the non-motorized transport device of FIG. 1 equipped with an additional handlebar.

DETAILED DESCRIPTION

Figure 1:
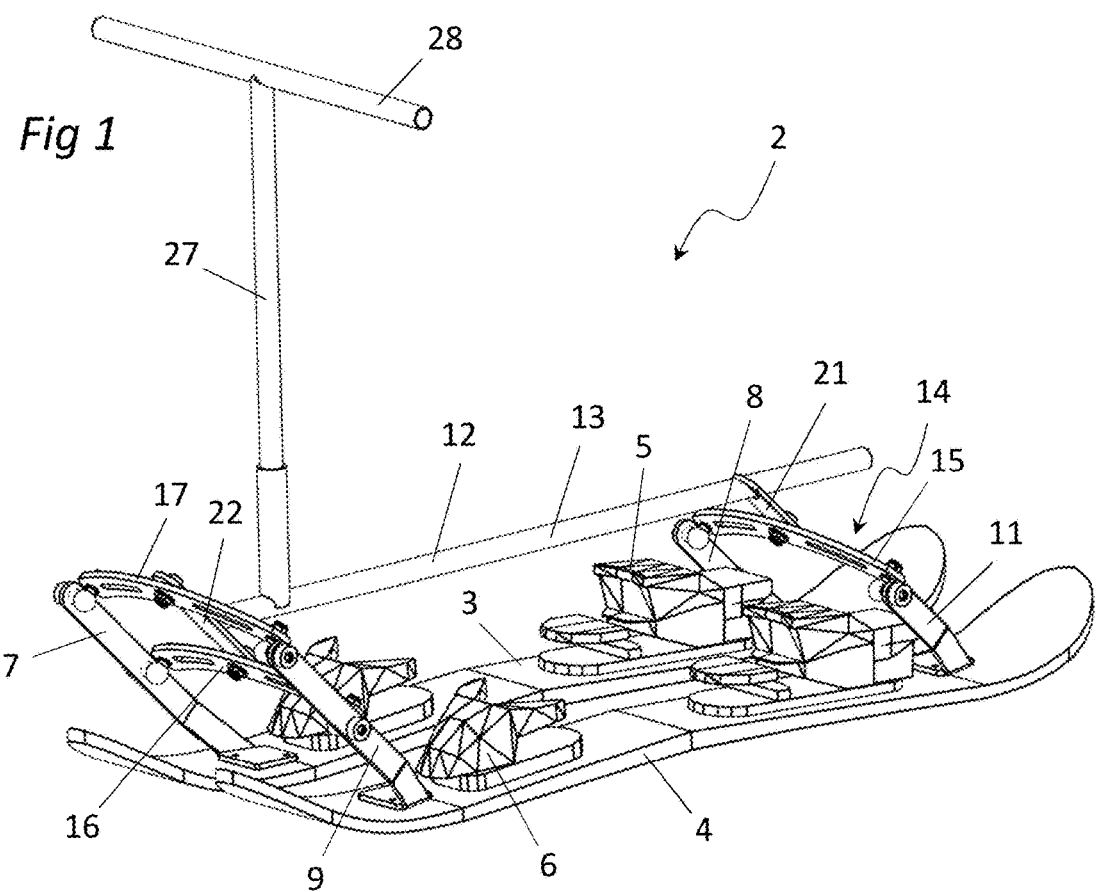
FIG. 1 is a perspective view of a non-motorized transport device according to a first embodiment of the present invention.

FIGS. 1 to 8 represent a non-motorized transport device 2 for transporting a person, and for example a person with reduced mobility or disabled or still a child, in standing position on a snowy slope. More particularly, the non-motorized transport device 2 is configured to enable a person to practice skiing while standing.

The non-motorized transport device 2 comprises a first ski 3 and a second ski 4 which extend substantially parallel to each other and which are intended to bear on the ground. The first and second skis 3, 4 respectively include a first ski boot fixing device 5 and a second ski boot fixing device 6.

The non-motorized transport device 2 further comprises a first front fastening foot 7 and a first rear fastening foot 8 fastened on the first ski 3 respectively at the front and at the rear of the first ski boot fixing device 5, and a second front fastening foot 9 and a second rear fastening foot 11 fastened on the second ski 4 respectively at the front and at the rear of the second ski boot fixing device 6.

Figure 2:
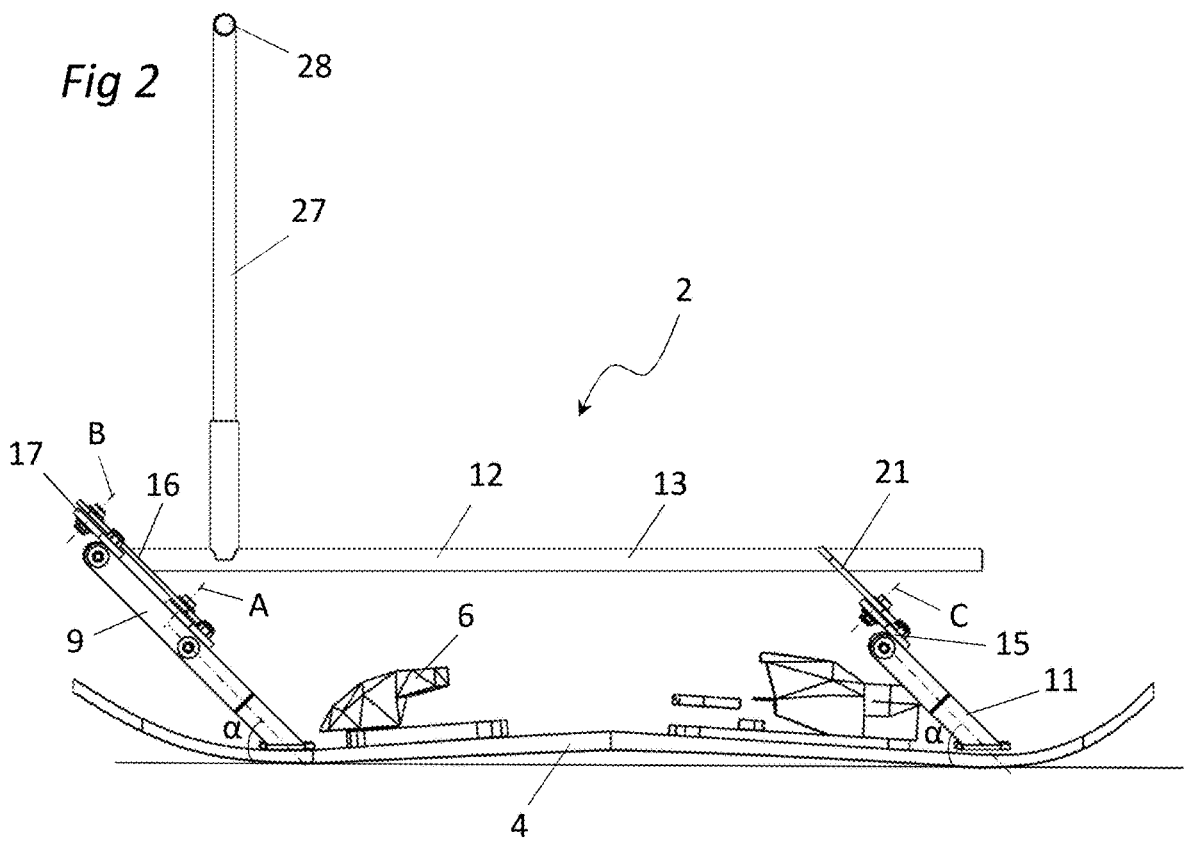
FIG. 2 is a side view of the non-motorized transport device of FIG. 1.
Figure 3:
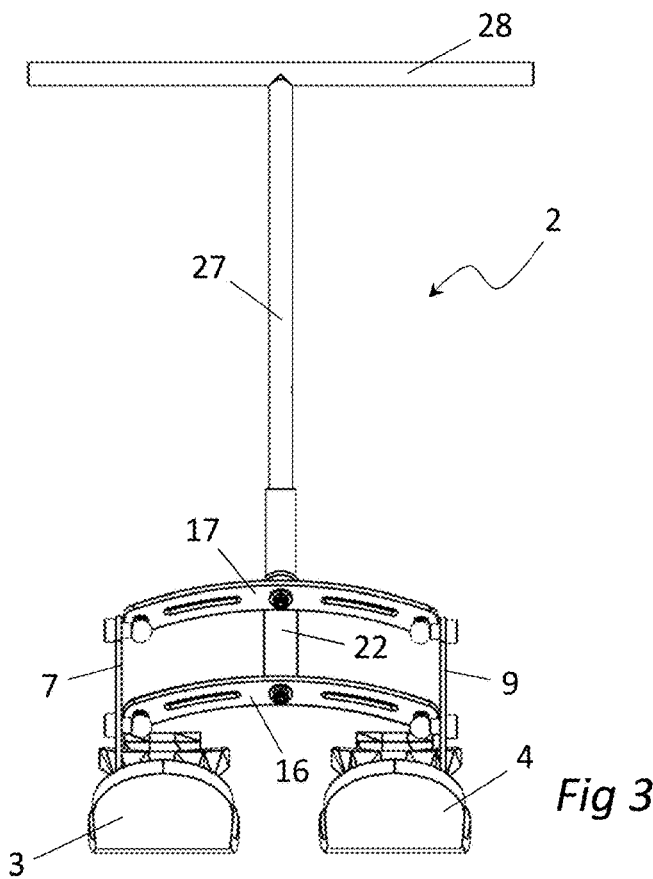
FIG. 3 is a front view of the non-motorized transport device of FIG. 1.
Figure 4:
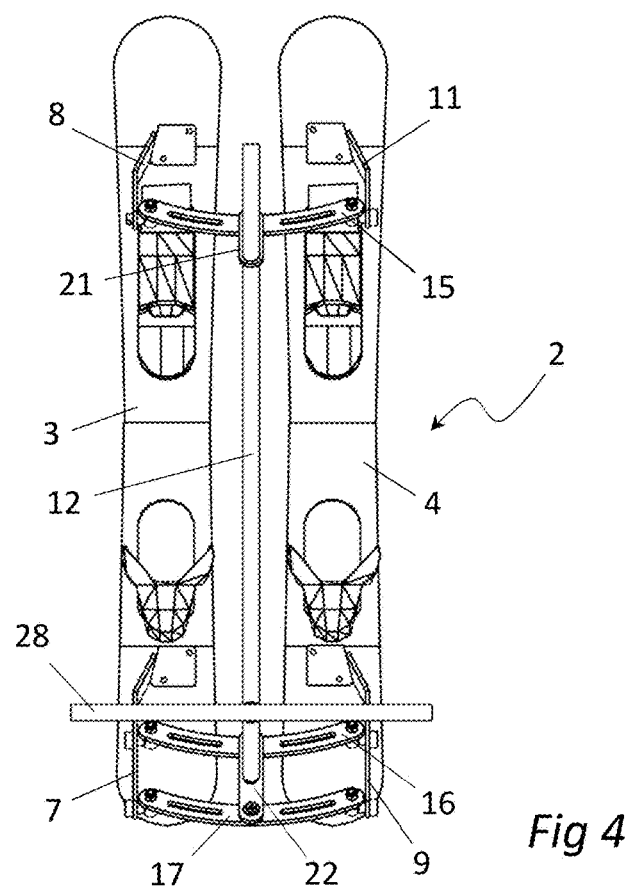
FIG. 4 is a top view of the non-motorized transport device of FIG. 1.
Figure 7:
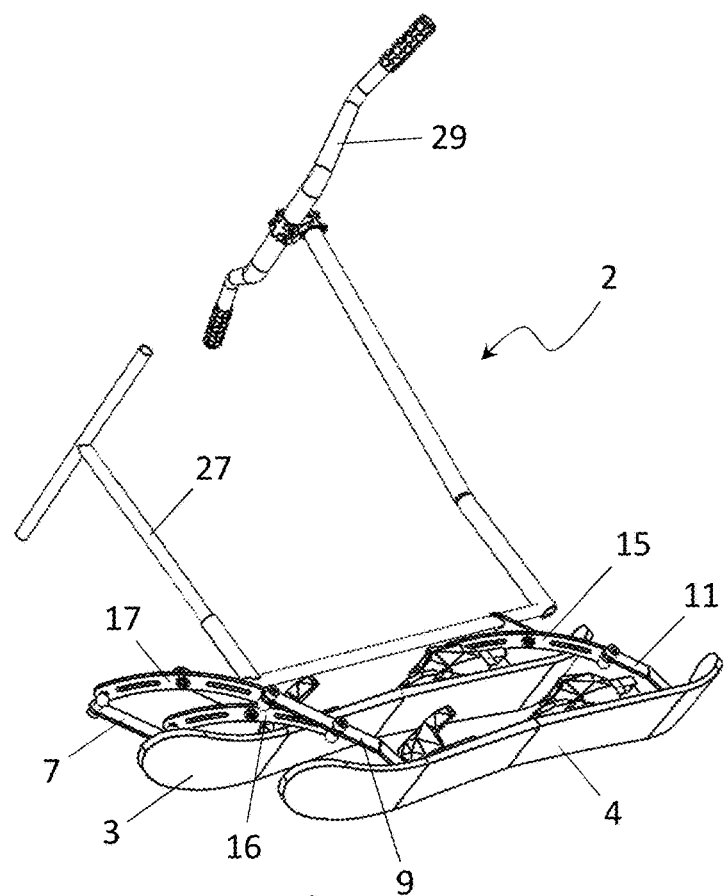
FIG. 7 is a perspective view of the non-motorized transport device of FIG. 1 showing edging to the right.
Figure 8:
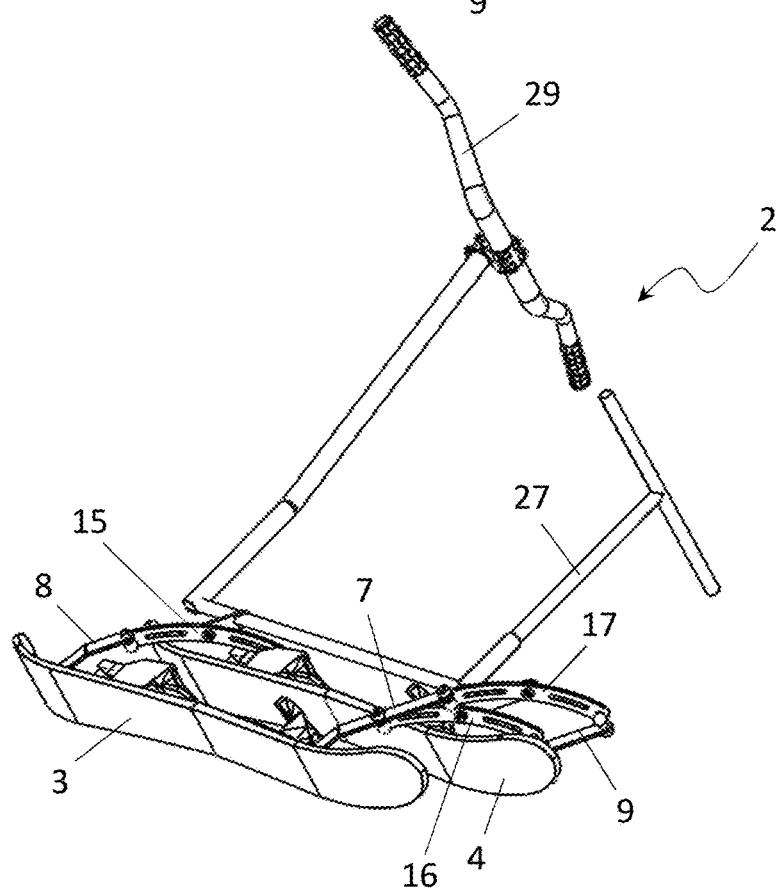
FIG. 8 is a perspective view of the non-motorized transport device of FIG. 1 showing edging to the left.

As shown more particularly in FIGS. 1 and 2, the first and second front fastening feet 7, 9 and the first and second rear fastening feet 8, 11 are configured to extend obliquely forwards and upwards when the soles of the first and second skis 3, 4 rest on a horizontal support. Advantageously, when the soles of the first and second skis 3, 4 rest on a horizontal support, each of the first and second front and rear fastening feet is inclined with respect to the horizontal by an angle of inclination a comprised between 20 and 60°, and preferably between 40 and 50°, and for example about 45°.

The non-motorized transport device 2 further comprises a longitudinal beam 12 extending substantially parallel to the first and second skis 3, 4. Advantageously, the longitudinal beam 12 extends in a longitudinal midplane of the non-motorized transport device 2 when the soles of the first and second skis 3, 4 rest on a horizontal support, and the first and second skis 3, 4 are configured to extend symmetrically on either side of the longitudinal beam 12 when the soles of the first and second skis rest on a horizontal support.

According to the embodiment represented in FIGS. 1 to 8, the longitudinal beam 12 includes a main beam portion 13 which is rectilinear and which extends according to a direction of extension which is substantially parallel to the first and second skis 3, 4. Advantageously, the main beam portion 13 has a circular cross-section, and the direction of extension of the main beam portion 13 is substantially horizontal when the soles of the first and second skis 3, 4 rest on a horizontal support.

The non-motorized transport device 2 also comprises a connecting system 14 configured to connect, i.e. to link, the longitudinal beam 12 to the first and second front fastening feet 7, 9 and to the first and second rear fastening feet 8, 11.

The connecting system 14 includes a rear connecting rod 15 extending transversely to the longitudinal beam 12, and a first front connecting rod 16 and a second front connecting rod 17 also extending transversely to the longitudinal beam 12. As shown more particularly in FIG. 5, the first and second front fastening feet 7, 9 and the first and second front connecting rods 16, 17 form a parallelogram linkage whose operation will be described in more details hereinafter.

As shown in FIG. 2, the first front connecting rod 16 and the rear connecting rod 15 are configured to be located under the main beam portion 13 when the soles of the first and second skis 3, 4 rest on a horizontal support, and the second front connecting rod 17 is configured to be located above the main beam portion 13 when the soles of the first and second skis 3, 4 rest on a horizontal support.

According to the embodiment represented in FIGS. 1 to 8, each of the first and second front connecting rods 16, 17 and the rear connecting rod 15 is bent in a circle arc. However, the first and second front connecting rods 16, 17 and the rear connecting rod 15 could have any other shape, and for example an inverted V or M like general shape.

As shown more particularly in FIGS. 2 and 5, each of the first and second front connecting rods 16, 17 includes a middle portion pivotally mounted on the longitudinal beam 12 about a respective front articulation axis A, B, and first and second end portions which are respectively connected to the first and second front fastening feet 7, 9 by respective front ball-joint connections 18. The rear connecting rod 15 also includes a middle portion pivotally mounted on the longitudinal beam 12 about a rear articulation axis C, and first and second end portions respectively connected to the first and second rear fastening feet 8, 11 by respective rear ball-joint connections 19.

As shown more particularly in FIG. 2, each of the front articulation axes A, B and the rear articulation axis C is configured to extend obliquely forwards and downwards when the soles of the first and second skis 3, 4 rest on a horizontal support. Advantageously, when the soles of the first and second skis 3, 4 rest on a horizontal support, the front and rear articulation axes A, B, C are inclined with respect to the horizontal by an angle comprised between 20 and 60°, and preferably between 40° and 50°, and for example about 45°.

As also shown in FIG. 2, the first and second front connecting rods 16, 17 are configured to pivot in a first pivot plane, and the rear connecting rod 15 is configured to pivot in a second pivot plane which is substantially parallel to the first pivot plane.

According to the embodiment represented in FIGS. 1 to 8, the longitudinal beam 12 includes a rear fastening member 21 on which the middle portion of the rear connecting rod 15 is pivotally mounted, and a front fastening member 22 on which the middle portions of the first and second front connecting rods 16, 17 are pivotally mounted. As shown more particularly in FIG. 1, the rear fastening member 21 is fastened to a rear end portion of the main beam portion 13, and the front fastening member 22 is fastened to a front end portion of the main beam portion 13.

Each of the rear and front fastening members 21, 22 is configured to extend obliquely with respect to the horizontal when the soles of the first and second skis 3, 4 rest on a horizontal support. Advantageously, when the soles of the first and second skis 3, 4 rest on a horizontal support, the rear and front fastening members 21, 22 are inclined with respect to the horizontal by an angle of inclination comprised between 20 and 60°, and preferably between 40 and 50°, and for example about 45°.

As shown more particularly in FIG. 5, the front and rear ball-joint connections 18, 19 are identical. In particular, each of the front ball-joint connections 18 includes a first front connecting member 23 comprising a first front mounting portion fastened to a respective connecting rod amongst the first and second front connecting rods 16, 17, and a second front connecting member 24 comprising a second front mounting portion fastened to a respective fastening foot amongst the first and second front fastening feet 7, 9, and each of the rear ball-joint connections 19 includes a first rear connecting member 25 comprising a first rear mounting portion fastened to the rear connecting rod 15, and a second rear connecting member 26 comprising a second rear mounting portion fastened to a respective fastening foot amongst the first and second rear fastening feet 8, 11.

Advantageously, the first and second front mounting portion of each of the front ball-joint connections 18 are directed substantially at 90° with respect to each other when the soles of the first and second skis 3, 4 rest on a horizontal support, and the first and second rear mounting portions of each of the rear ball-joint connections 19 are directed substantially at 90° with respect to each other when the soles of the first and second skis 3, 4 rest on a horizontal support.

According to the embodiment represented in FIGS. 1 to 8, the first front connecting member 23 of each front ball-joint connection 18 includes a spherical head (not shown in the figures), and the second front connecting member 24 of each front ball-joint connection 18 includes a spherical cavity (not shown in the figures) within which the respective spherical head is fitted. Similarly, the first rear connecting member 25 of each rear ball-joint connection 19 also includes a spherical head (not shown in the figures), and the second rear connecting member 26 of each rear ball-joint connection 19 includes a spherical cavity (not shown in the figures) within which the respective spherical head is fitted.

The non-motorized transport device 2 further comprises an edging handle 27 which is fastened to a front portion of the longitudinal beam 12, and more particularly of the main beam portion 13, and which is configured to be handled by the person transported by the non-motorized transport device 2. Advantageously, the edging handle 27 is equipped, at the upper portion, with a main handlebar 28 intended to be grasped by the transported person.

According to the embodiment represented in FIGS. 1 to 8, the edging handle 27 is configured to extend substantially vertically when the soles of the first and second skis 3, 4 rest on a horizontal support, and the main handlebar 28 advantageously has a width larger than the maximum distance separating the outer longitudinal edges of the first and second skis 3, 4 when the soles of the first and second skis 3, 4 rest on a horizontal support.

As shown in FIG. 6, the non-motorized transport device 2 may also include an additional handlebar 29 which is removably fastened to a rear portion of the longitudinal beam 12, and which is configured to be grasped by an accompanier of the transported person so as to guide the displacements of the non-motorized transport device 2.

Advantageously, the soles of the first and second skis 3, 4 are configured to extend substantially parallel to each other regardless of the angle of inclination of the edging handle 27.

The operation of the non-motorized transport device 2 according to the present invention when crossing a slope will now be described.

When the person transported by the non-motorized transport device 2 wishes to turn to the left in order to cross a slope, said person tilts the edging handle 27 to the left, which induces a deformation of the parallelogram linkage, formed by the first and second front fastening feet 7, 8 and the first and second front connecting rod 16, 17, such that the first and second skis 3, 4 pivot so as to enable edging to the left, such that the second ski 4 is raised with respect to the first ski 3, and finally such that the second ski 4 is displaced longitudinally forwards with respect to the first ski 3.

Similarly, when the person transported by the non-motorized transport device 2 wishes to turn to the right in order to cross a slope, said person tilts the edging handle 27 to the right, which induces a deformation of the parallelogram linkage, formed by the first and second front fastening feet 7, 8 and the first and second front connecting rod 16, 17, such that the first and second skis 3, 4 pivot so as to enable edging to the right, such that the first ski 3 is raised with respect to the second ski 4, and finally such that the first ski 3 is displaced longitudinally forwards with respect to the second ski 4.

Thus, by simply actuating the edging handle 27, the person transported by the non-motorized transport device 2 can easily pilot the non-motorized transport device 2, while having an optimized slipping run.

In addition, the presence of the front and rear ball-joint connections 18, 19 enables each of the first and second skis 3, 4 to be tilt forwards and rearwards independently, and therefore to adapt to the deformations of the terrain encountered by the non-motorized transport device 2, which considerably limits wearing of the connecting system 14 and the risks of break-up of the latter and/or of the first and second skis 3, 4.

Figure 9:
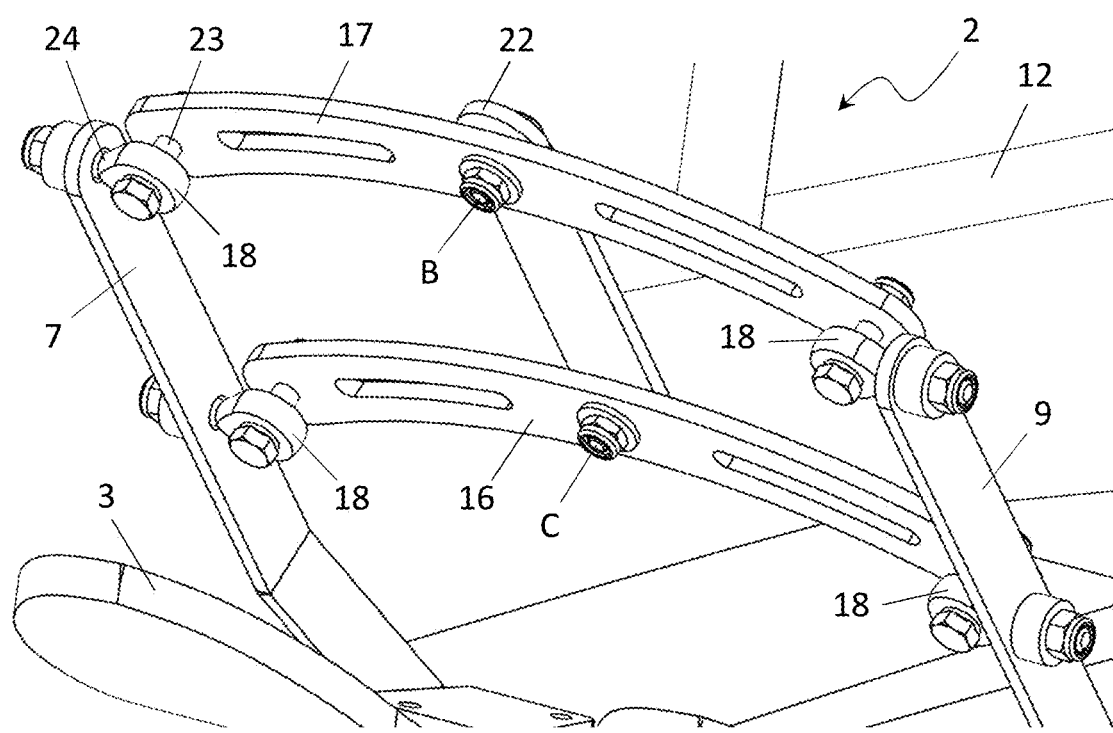
FIG. 9 is a partial perspective view of a non-motorized transport device according to a second embodiment of the invention.

FIG. 9 represents a non-motorized transport device 2 according to a second embodiment of the invention which differs from the first embodiment represented in FIGS. 1 to 8 essentially in that the second front connecting member 24 of each of the front ball-joint connections 18 includes an outer ring secured to the respective second mounting portion and an inner ring which is mounted articulated within the respective outer ring and which delimits a passage within which the respective first front connecting member 23 is received. Similarly, the second rear connecting member 26 of each of the rear ball-joint connections 19 may also include an outer ring secured to the respective second mounting portion and an inner ring which is mounted articulated within the respective outer ring and which delimits a passage within which the respective first rear connecting member 25 is received.

It goes without saying that the invention is not limited to the sole embodiments of this non-motorized transport device 2, described hereinabove as examples, it encompasses, on the contrary, all variants thereof.

The invention claimed is:

1. A non-motorized transport device for transporting a person in standing position on a snowy slope, comprising:
   a first ski and a second ski which extend substantially parallel to each other and which are intended to bear on ground, the first ski including a first ski boot fixing device and the second ski including a second ski boot fixing device;
   a first front fastening foot fastened on the first ski at a front of the first ski boot fixing device and a first rear fastening foot fastened on the first ski at a rear of the first ski boot fixing device;
   a second front fastening foot fastened on the second ski at a front of the second ski boot fixing device and a second rear fastening foot fastened on the second ski at a rear of the second ski boot fixing device;
   a longitudinal beam;
   an edging handle which is fastened to a front portion of the longitudinal beam and which is configured to be handled by the person; and
   a connecting system configured to connect the longitudinal beam to the first front fastening foot and the second front fastening foot and to the first rear fastening foot and the second rear fastening foot, the connecting system including at least:
      a first front connecting rod and a second front connecting rod extending transversely to the longitudinal beam, the first front fastening foot and the second front fastening foot and the first front connecting rod and second front connecting rod forming a parallelogram linkage, each of the first front connecting rod and the second front connecting rods including a middle portion pivotally mounted on the longitudinal beam about a respective front articulation axis (A, B) and a first end portion and a second end portions which are respectively connected to the first front fastening foot and the second front fastening foot by respective front ball-joint connections; and
      a rear connecting rod extending transversely to the longitudinal beam, the rear connecting rod including a middle portion pivotally mounted on the longitudinal beam about a rear articulation axis (C) and first and second end portions respectively connected to the first rear fastening foot and the second rear fastening foot by respective rear ball joint connections; and
   wherein the respective front articulation axes (A, B) and the rear articulation axis (C) are configured to extend obliquely forwards and downwards when soles of the first ski and the second ski rest on a horizontal support.

2. The non-motorized transport device according to claim 1, wherein when the soles of the first ski and the second ski rest on the horizontal support, the respective front articulation axes (A, B) and the rear articulation axis (C) are inclined with respect to a horizontal of an angle comprised between 20° and 60°.

3. The non-motorized transport device according to claim 1, wherein the first front fastening foot, the second front fastening foot, the first rear fastening foot and the second front and rear fastening foot are configured to extend obliquely forwards and upwards when the soles of the first ski and the second ski rest on the horizontal support.

4. The non-motorized transport device according to claim 1, wherein the first front connecting rod and the second front connecting rods are configured to pivot in a first pivot plane, and the rear connecting rod is configured to pivot in a second pivot plane which is substantially parallel to the first pivot plane.

5. The non-motorized transport device according to claim 1, wherein the edging handle is configured to extend substantially vertically when the soles of the first ski and the second skis rest on the horizontal support.

6. The non-motorized transport device according to claim 1, wherein the edging handle is equipped with a main handlebar intended to be grasped by the person.

7. The non-motorized transport device according to claim 6, wherein the main handlebar has a width larger than a maximum distance separating outer longitudinal edges of the first ski and the second ski.

8. The non-motorized transport device according to claim 1, wherein the first front connecting rod, the second front connecting rod and the rear connecting rod are bent in a circle arc.

9. The non-motorized transport device according to claim 1, further including an additional handlebar which is removably fastened to a rear portion of the longitudinal beam.

10. The non-motorized transport device according to claim 1, wherein when the soles of the first ski and the second ski rest on the horizontal support, the respective front articulation axes (A, B) and the rear articulation axis (C) are inclined with respect to a horizontal of an angle comprised between 40° and 50°.

11. The non-motorized transport device according to claim 10, wherein the first front fastening foot, the second front fastening foot, the first rear fastening foot and the second rear fastening foot are configured to extend obliquely forwards and upwards when the soles of the first ski and the second ski rest on the horizontal support.

12. The non-motorized transport device according to claim 2, wherein the first front fastening foot, the second front fastening foot, the first rear fastening foot and the second rear fastening foot are configured to extend obliquely forwards and upwards when the soles of the first ski and the second ski rest on the horizontal support.

13. The non-motorized transport device according to claim 12, wherein the first front connecting rod and the second front connecting rod are configured to pivot in a first pivot plane, and the rear connecting rod is configured to pivot in a second pivot plane which is substantially parallel to the first pivot plane.

14. The non-motorized transport device according to claim 13, wherein the edging handle is configured to extend substantially vertically when the soles of the first ski and the second ski rest on the horizontal support.

15. The non-motorized transport device according to claim 14, wherein the edging handle is equipped with a main handlebar intended to be grasped by the person.

16. The non-motorized transport device according to claim 15, wherein the main handlebar has a width larger than a maximum distance separating outer longitudinal edges of the first ski and the second ski.

17. The non-motorized transport device according to claim 16, wherein the first front connecting rod, the second front connecting rod and the rear connecting rod are bent in a circle arc.

18. The non-motorized transport device according to claim 17, further including an additional handlebar which is removably fastened to a rear portion of the longitudinal beam.

19. The non-motorized transport device according to claim 11, wherein the first front fastening foot, the second front fastening foot, the first rear fastening foot and the second rear fastening foot are configured to extend obliquely forwards and upwards when the soles of the first ski and the second ski rest on the horizontal support.

20. The non-motorized transport device according to claim 19, wherein the first front connecting rod and the second front connecting rod are configured to pivot in a first pivot plane, and the rear connecting rod is configured to pivot in a second pivot plane which is substantially parallel to the first pivot plane.

* * * * *